US012738434B2

(12) United States Patent
Cheng et al.

(10) Patent No.: US 12,738,434 B2
(45) Date of Patent: Sep. 15, 2026

(54) POWER TOOL AND SWITCH DEVICE THEREOF

(71) Applicant: DELTA ELECTRONICS, INC., Taoyuan City (TW)

(72) Inventors: Chung-Hsin Cheng, Taoyuan City (TW); Wen-Hao Kuo, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 213 days.

(21) Appl. No.: 18/823,700

(22) Filed: Sep. 4, 2024

(65) Prior Publication Data

US 2025/0387896 A1 Dec. 25, 2025

(30) Foreign Application Priority Data

Jun. 20, 2024 (CN) ........................ 202410799758.X

(51) Int. Cl.
*H01H 36/00* (2006.01)
*B25F 5/02* (2006.01)

(52) U.S. Cl.
CPC ........... *H01H 36/0073* (2013.01); *B25F 5/02* (2013.01)

(58) Field of Classification Search
CPC .......... B25F 5/02; H01H 36/0073; H01H 9/06
See application file for complete search history.

(56) References Cited

U.S. PATENT DOCUMENTS

| | | | |
|---|---|---|---|
| 6,923,268 | B2 | 8/2005 | Totsu |
| 8,689,901 | B2 | 4/2014 | Chen |
| 2022/0134532 | A1 | 5/2022 | Merget et al. |

FOREIGN PATENT DOCUMENTS

| | | | | |
|---|---|---|---|---|
| CN | 114096382 A | | 2/2022 | |
| DE | 202007018456 U1 | * | 7/2008 | ......... H01H 36/0073 |

* cited by examiner

*Primary Examiner* — Mohamad A Musleh
(74) *Attorney, Agent, or Firm* — HDLS IPR SERVICES; Chun-Ming Shih

(57) ABSTRACT

A power tool and a switch device thereof are disclosed. The switch device includes a housing, a slider, a magnetic component, a trigger and a control module. The magnetic component generates a magnetic field. The magnetic component is driven by the slider to move along a power-off path and a power-on path. The trigger is pressed by the slider. The control module includes a magnetic sensor generating a position signal according to a position of the magnetic component in the magnetic field. When the magnetic component is located on the power-off path, the control module is turned off. When the magnetic component is moved from the power-off path to the power-on path, the slider triggers the trigger to activate the control module. When the magnetic component is located on the power-on path, the control module outputs a control signal according to the position signal.

16 Claims, 5 Drawing Sheets

POWER TOOL AND SWITCH DEVICE THEREOF

BACKGROUND OF THE DISCLOSURE

Technical Field

The technical field relates to a power tool, and more particularly relates to a power tool and a switch device thereof.

Description of Related Art

A switch device of a power tool in related art mostly uses a leaf spring to contact printed circuit boards (PCB) and perform a segmented control of speed or torque. As the leaf spring and PCBs are in mechanical contact, frictional wear and other related problems are occurred on their contacting surfaces after long-term use and operation. Additionally, some power tools use electromagnetic switches. Although there is no frictional wear as mentioned above, the electromagnetic switches must be kept in the energized state to operate, and which may cause power consumption issues.

In view of the above drawbacks, the inventor proposes this disclosure based on his expert knowledge and elaborate researches in order to solve the problems of the related art.

SUMMARY OF THE DISCLOSURE

This disclosure provides a power tool and a switch device thereof.

This disclosure provides a switch device for a power tool. The switch device includes a housing, a slider, a magnetic component, a trigger and a control module. The slider is movably arranged on the housing. The magnetic component is arranged on the slider and configured to generate a magnetic field. The magnetic component is driven by the slider to move along a power-off path and a power-on path connected with each other. The trigger is arranged in the housing and configured to be pressed by the slider. The control module is arranged in the housing and electrically connected to the trigger. The control module includes a magnetic sensor disposed corresponding to the magnetic component and configured to generate a position signal according to a position of the magnetic component in the magnetic field. When the magnetic component is located on the power-off path, the control module is turned off. When the magnetic component is moved from the power-off path to the power-on path, the slider triggers the trigger to activate the control module. When the magnetic component is located on the power-on path, the control module outputs a control signal according to the position signal.

In one embodiment of this disclosure, the trigger includes a swing arm and a conductive contact electrically connected to the control module, and the swing arm is configured to be pressed by the slider to contact with the conductive contact.

In one embodiment of this disclosure, the swing arm is disposed pivotally on the housing and includes a first arm and a second arm linked to rotate pivotally, the first arm is configured to be pressed by the slider to contact with the conductive contact, and the second arm is configured to be pressed by the slider to make the first arm move away from the conductive contact.

In one embodiment of this disclosure, during the magnetic component moving from the power-off path to the power-on path, the magnetic component leaves the power-off path and presses the first arm, and the magnetic component moves to the power-on path.

In one embodiment of this disclosure, when the magnetic component is located on the power-on path, the slider contacts the first arm.

In one embodiment of this disclosure, when the magnetic component is located on the power-off path, the slider contacts the second arm.

In one embodiment of this disclosure, the switch device further includes an elastic component connected between the slider and the housing, and the elastic component is configured to make the slider return to an initial position.

In one embodiment of this disclosure, when the slider is on the initial position, the magnetic component is located at one end of the power-off path opposite to the power-on path.

This disclosure provides a power tool includes a housing, a motor, a slider, a magnetic component, a trigger and a control module. The motor is arranged in the housing. The slider is movably arranged on the housing. The magnetic component is arranged on the slider and configured to generate a magnetic field. The magnetic component is driven by the slider to move along a power-off path and a power-on path connected with each other. The trigger is arranged in the housing and configured to be pressed by the slider. The control module is arranged in the housing and electrically connected to the trigger and the motor. The control module includes a magnetic sensor disposed corresponding to the magnetic component and configured to generate a position signal according to a position of the magnetic component in the magnetic field. When the magnetic component is located on the power-off path, the control module and the motor are turned off. When the magnetic component is moved from the power-off path to the power-on path, the slider triggers the trigger to activate the control module. When the magnetic component is located on the power-on path, the control module outputs a control signal to the motor according to the position signal, and controls the motor to an operating state correspondingly.

In one embodiment of this disclosure, the trigger includes a swing arm and a conductive contact electrically connected to the control module, and the swing arm is configured to be pressed by the slider to contact with the conductive contact.

In one embodiment of this disclosure, the swing arm is disposed pivotally on the housing and includes a first arm and a second arm linked to rotate pivotally, the first arm is configured to be pressed by the slider to contact with the conductive contact, and the second arm is configured to be pressed by the slider to make the first arm move away from the conductive contact.

In one embodiment of this disclosure, during the magnetic component moving from the power-off path to the power-on path, the magnetic component leaves the power-off path and presses the first arm, and then the magnetic component moves to the power-on path.

In one embodiment of this disclosure, when the magnetic component is located on the power-on path, the slider contacts the first arm.

In one embodiment of this disclosure, when the magnetic component is located on the power-off path, the slider contacts the second arm.

In one embodiment of this disclosure, the power tool further includes an elastic component connected between the slider and the housing, and the elastic component is configured to make the slider return to an initial position.

In one embodiment of this disclosure, when the slider is on the initial position, the magnetic component is located at one end of the power-off path opposite to the power-on path.

This disclosure includes a mechanical trigger and an electromagnetic control module. Thus, the control module may avoid the frictional wear of the related art and may further avoid consuming standby power. When pressing the slider in the first stage, the mechanical trigger is electrically conducted and electrified. While continuing to press the slider, the electromagnetic control module detects the position of the magnetic sensor in the magnetic field of the magnetic component, thereby controlling the speed or torque of the motor accordingly.

BRIEF DESCRIPTION OF DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
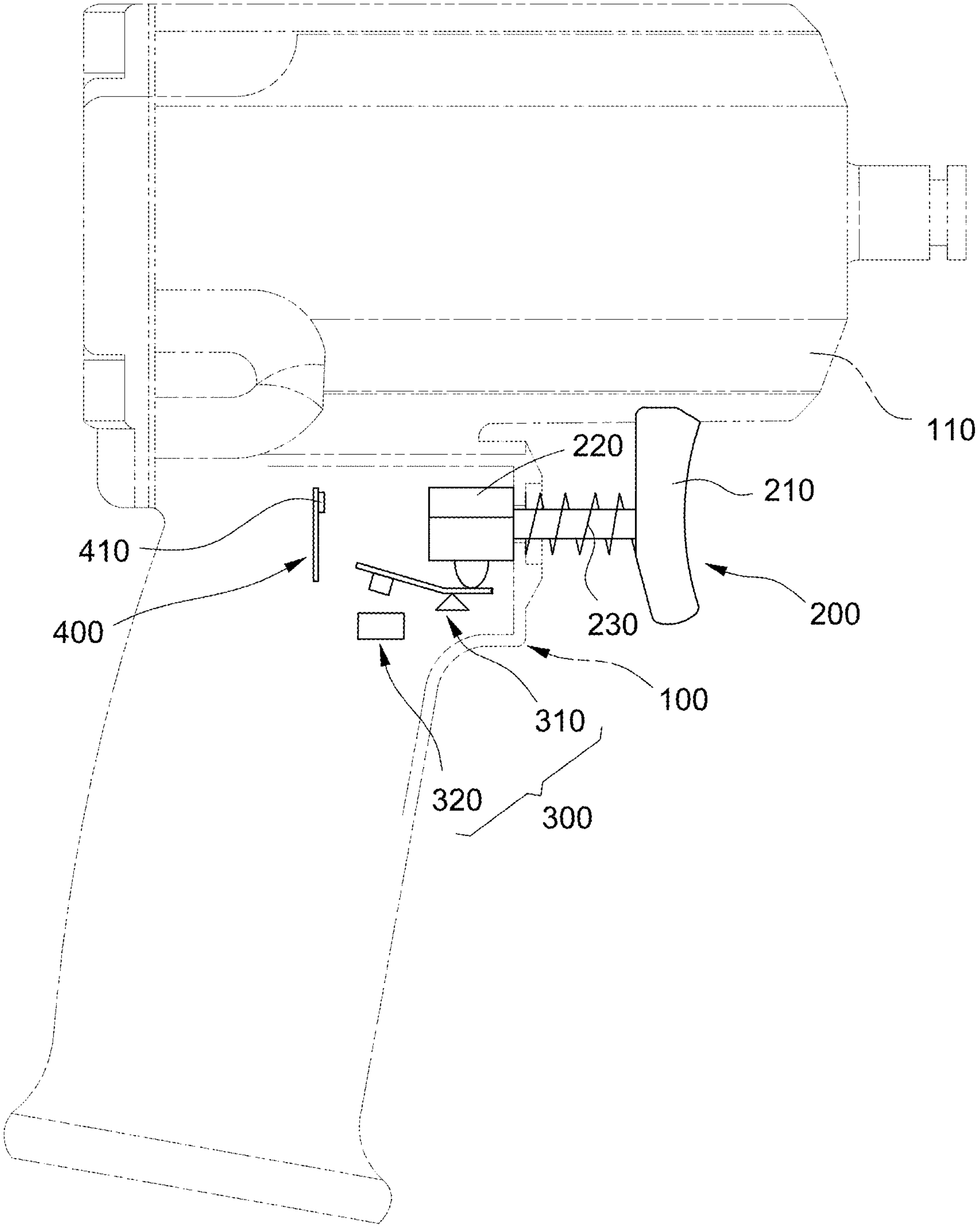
FIG. 1 is a schematic view of the power tool and the switch device of the first embodiment in this disclosure.

Please refer to FIG. 1, which depict a schematic view of the power tool of the first embodiment in this disclosure. The power tool includes a motor 110 and a switch device combined with the motor 110. The switch device includes a housing 100, a slider 200, a magnetic component 220, a trigger 300 and a control module 400. In this embodiment, the motor 110 is arranged in the housing 100.

In this embodiment, the slider 200 is movably arranged on the housing 100. The slider 200 includes a button 210 exposed from the housing 100 for being pressed. Additionally, the power tool may further include an elastic component 230 connected between the slider 200 and the housing 100, and the elastic component is capable of returning the slider 200 to an initial position.

Figure 2:
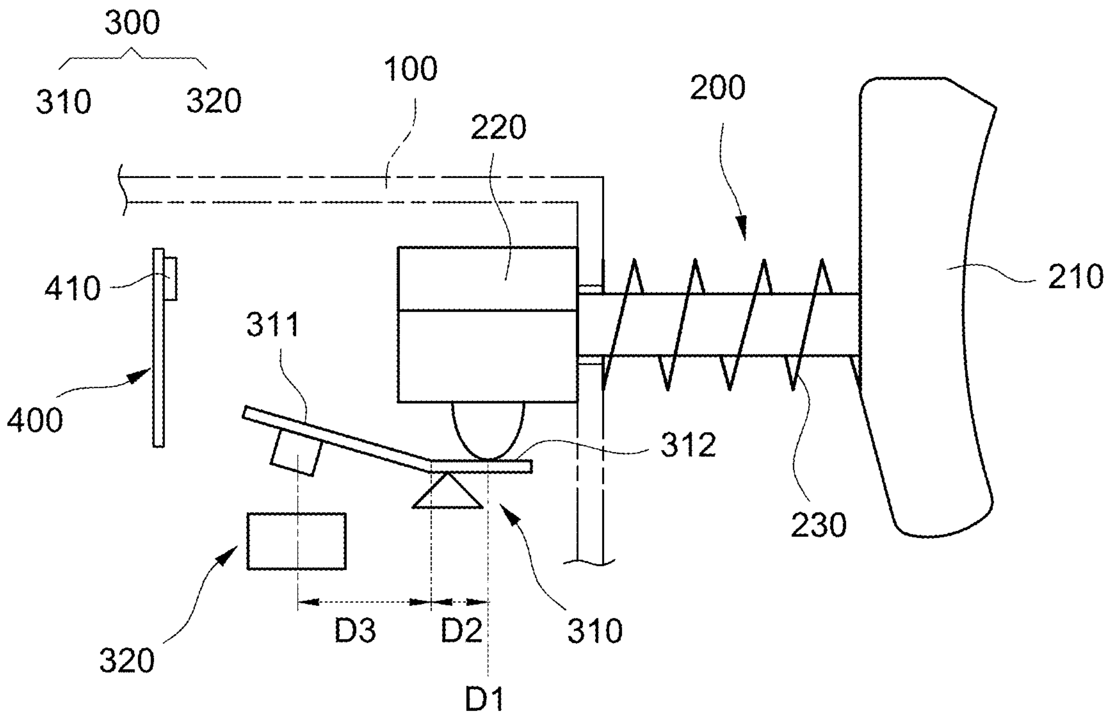
FIG. 2 is a schematic view depicting the initial position of the power tool and the switch device thereof according to the first embodiment of this disclosure, showing the magnetic component located at the starting point of the power-off path.
Figure 3:
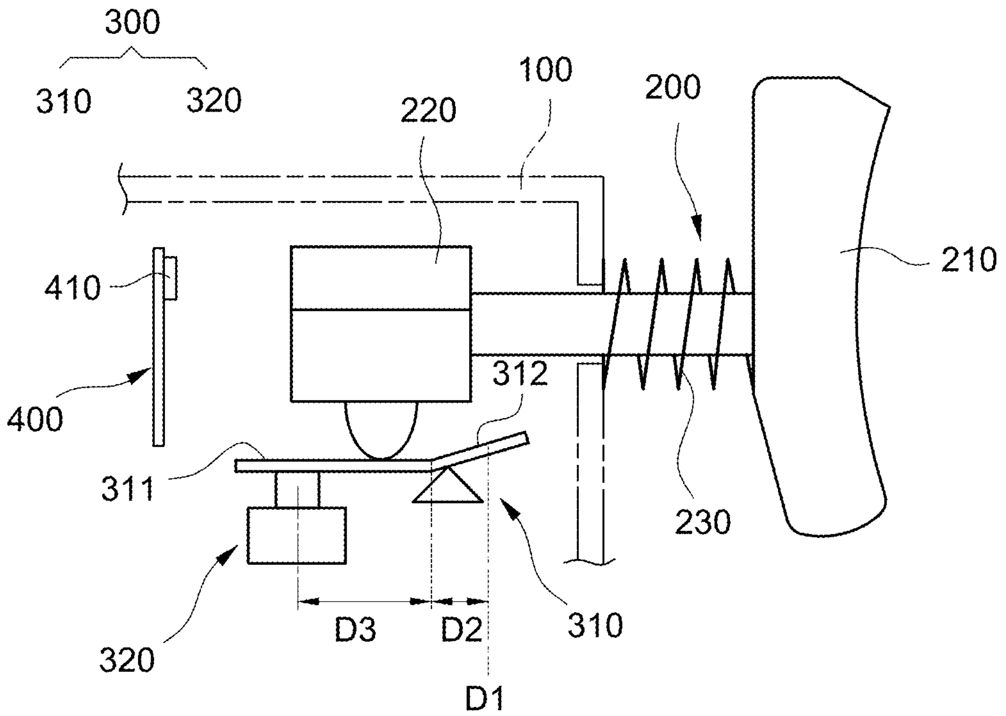
FIG. 3 and FIG. 4 are schematic views of the power tool and the switch device thereof according to the first embodiment of this disclosure, showing the magnetic component located on the power-on path.
Figure 4:
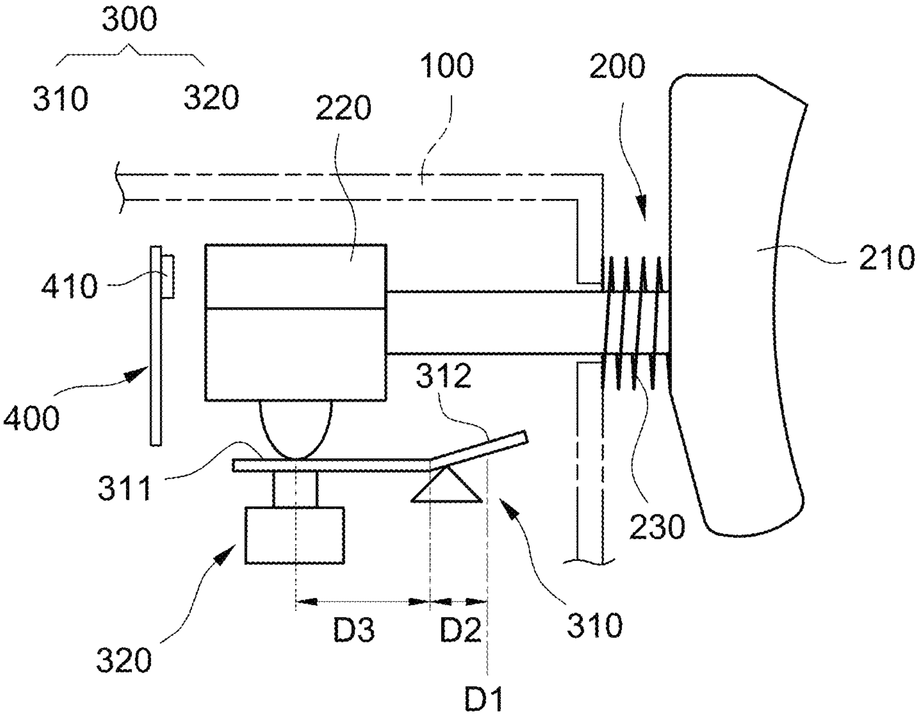

Please refer to FIG. 2 to FIG. 4, the magnetic component 220 is arranged on the slider 200 and generates a magnetic field. Specifically, the magnetic component 220 may be a magnetized metal, metal oxide, or an alloy. The magnetic component 220 is driven by the slider 200. The moving path (stroke) of the magnetic component 220 includes a power-off path and a power-on path. The position of the magnetic component 220 is determined relative to the reference point as shown in the figure. One end of the power-off path D2 is connected to the power-on path D3, and the other end of the power-off path D2, opposite to the power-on path D3, is the starting point D1. When the slider 200 is on the initial position, the magnetic component 220 is located at the starting point D1 of the power-off path D2. That is, the elastic component 230 may push the slider 200 to return the magnetic component 220 to the starting point D1 along the moving path.

The trigger 300 is arranged in the housing 100. The trigger 300 is electrically connected to the control module 400 and may be pressed by the slider 200 to activate the control module 40. In this embodiment, the trigger 300 includes a swing arm 310 and a conductive contact 320. The swing arm 310 is pressed by the slider 200 to contact with the conductive contact 320. Specifically, in this embodiment, the swing arm 310 is a lever pivoted on the housing 100. The swing arm 310 includes a first arm 311 and a second arm 312 linked to rotate pivotally. The first arm 311 is pressed by the slider 200 to contact with the conductive contact 320. The second arm 312 is configured to be pressed by the slider 200 to make the first arm 311 move away from the conductive contact 320. When the magnetic component 220 is located on the power-on path D3, the slider 200 contacts the first arm 311. When the magnetic component 220 is located on the power-off path D2, the slider 200 contacts the second arm 312. During the magnetic component 220 moving from the power-off path D2 to the power-on path D3, the magnetic component 220 leaves the power-off path D2 and presses the first arm 311, and then the magnetic component 220 moves to the power-on path D3.

However, the swing arm 310 referred to in this disclosure is not limited to the aforementioned embodiments. For example, the swing arm 310 may also be an elastic arm, pivotally mounted on the housing 100, and the elastic arm is elastic and capable of returning to original position. The swing arm 310 is pressed by the slider 200 to contact with the conductive contact 320. When the magnetic component 220 is located on the power-on path D3, the slider 200 contacts the swing arm 310. When the magnetic component is located on the power-off path, the slider 200 contacts the second arm. When the magnetic component 220 is located on the power-off path D2, the slider 200 moves away from the swing arm 310 so that the swing arm 310 is separated from the conductive contact 320.

The control module 400 is arranged in the housing 100 and electrically connected to the trigger 300 and the motor 110. Specifically, the swing arm 310 and the conductive contact 320 of the trigger 300 are electrically connected to the control module 400, respectively. The control module 400 includes a magnetic sensor 410 disposed corresponding to the magnetic component 220. The magnetic sensor 410 may generate a position signal according to the position of the magnetic component 220 in the magnetic field. In this embodiment, the magnetic sensor 410 is a Hall element capable of detecting current variations induced by magnetic fields to generate position signals. However, this disclosure is not limited thereto. In this embodiment, the magnetic sensor 410 is longitudinally aligned along the movement path of the magnetic component 220 and measures the distance variation between the magnetic sensor 410 and the magnetic component 220.

When the magnetic component 220 is located on the power-off path D2, the control module 400 and the motor 110 are turned off. When the magnetic component 220 is located on the power-on path D3, the control module 400 and the motor 110 are activated. The control module 400 then outputs a control signal to the motor 110 according to the position signal for controlling the motor 110 to the corresponding operating state.

This disclosure includes a mechanical trigger 300 and an electromagnetic control module 400. The control module 400 may avoid the frictional wear that exists in the related art and may further avoid consuming standby power. When pressing the slider 200 in the first stage, the mechanical trigger 300 is electrically conducted and electrified. While continuing to press the slider 200, the electromagnetic control module 400 detects the position of the magnetic sensor 410 in the magnetic field of the magnetic component, thereby controlling the speed or torque of the motor 110 accordingly.

Figure 5:
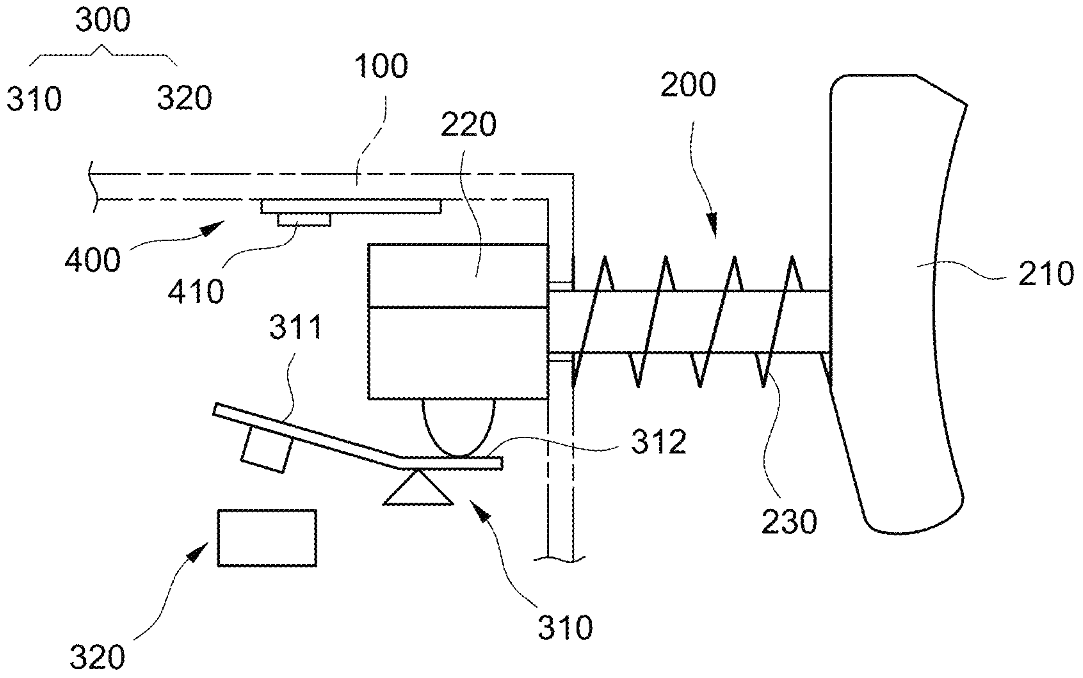
FIG. 5 is a schematic view of the initial position of the switch device according to the second embodiment of this disclosure, showing the magnetic component located at the starting point of the power-off path.
Figure 6:
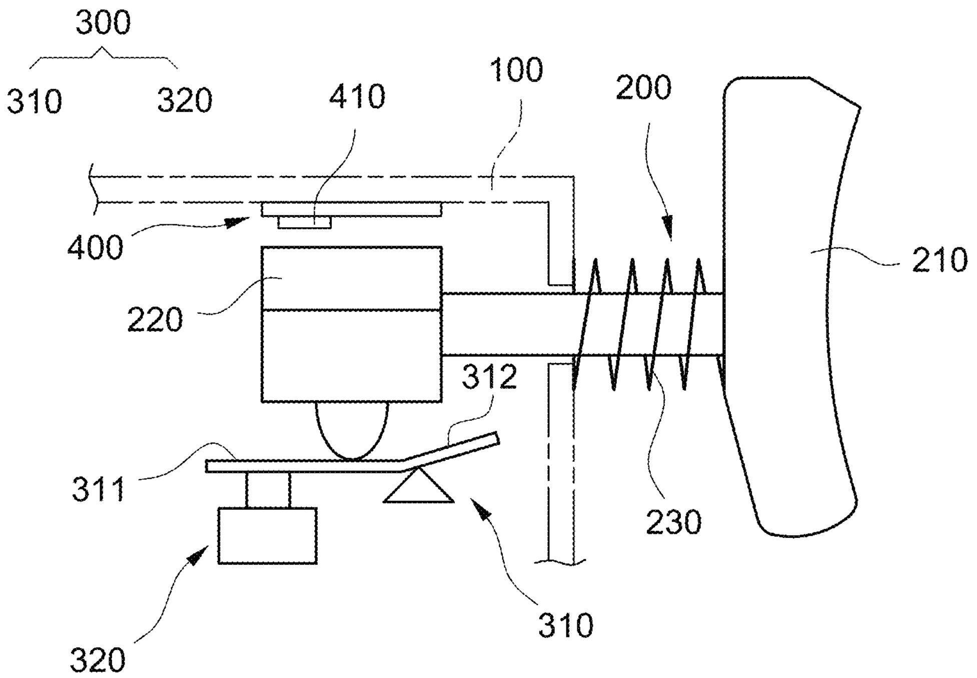
FIG. 6 and FIG. 7 are schematic views of the switch device according to the second embodiment of this disclosure, showing the magnetic component located on the power-on path.
Figure 7:
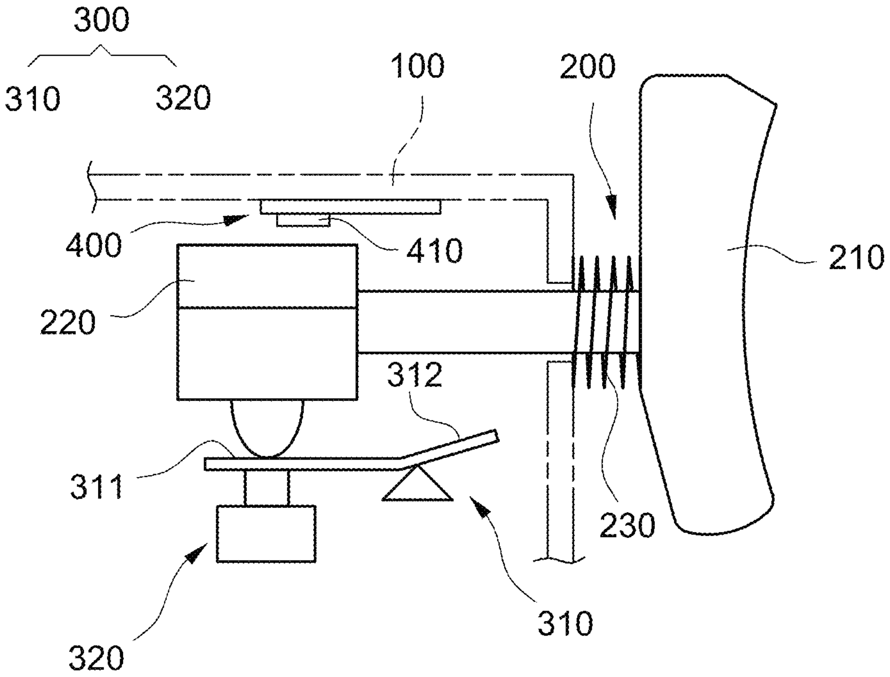

Please refer to FIG. 5 to FIG. 7. The second embodiment of this disclosure provides a switch device including a housing 100, a slider 200, a magnetic component 220, a trigger 300 and a control module 400. The switch device of this embodiment is applied to a power tool, as shown in FIG. 1 of the first embodiment.

In this embodiment, the slider 200 is movably arranged on the housing 100. The slider 200 includes a button 210 exposed from the housing 100 for being pressed. Additionally, the switch device may further include an elastic component 230 connected between the slider 200 and the housing 100, and the elastic component is capable of returning the slider 200 to an initial position.

The magnetic component 220 is arranged on the slider 200 and generates a magnetic field. Specifically, the magnetic component 220 may be a magnetized metal, metal oxide or an alloy. The magnetic component 220 is driven by the slider 200. The moving path of the magnetic component 220 includes a power-off path and a power-on path. The position of the magnetic component 220 is determined relative to the reference point, as shown in the figure. One end of the power-off path D2 is connected to the power-on path D3, and the other end of the power-off path D2, opposite to the power-on path D3, is the starting point D1. When the slider 200 is on the initial position, the magnetic component 220 is located at the starting point D1 of the power-off path D2. That is, the elastic component 230 may push the slider 200 to return the magnetic component 220 to the starting point D1 along the moving path.

The trigger 300 is arranged in the housing 100. The trigger 300 is electrically connected to the control module 400 and may be pressed by the slider 200 to activate the control module 40. In this embodiment, the trigger 300 includes a swing arm 310 and a conductive contact 320. The swing arm 310 is pressed by the slider 200 to contact with the conductive contact 320. Specifically, in this embodiment, the swing arm 310 is a lever pivoted on the housing 100. The swing arm 310 includes a first arm 311 and a second arm 312 linked to rotate pivotally. The first arm 311 is configured to be pressed by the slider 200 to contact with the conductive contact 320. The second arm 312 is pressed by the slider 200 to move the first arm 311 away from the conductive contact 320. When the magnetic component 220 is located on the power-on path, the slider 200 contacts the first arm 311. When the magnetic component 220 is located on the power-off path, the slider 200 contacts the second arm 312. During the magnetic component 220 moving from the power-off path D2 to the power-on path D3, the magnetic component 220 leaves the power-off path D2 and presses the first arm 311, and then the magnetic component 220 moves to the power-on path D3.

However, the swing arm 310 referred to in this disclosure is not limited to the aforementioned embodiments. For example, the swing arm 310 may also be an elastic arm pivotally mounted on the housing 100, and the elastic arm is elastic and configured to make the slider 200 return to original position. The swing arm 310 is pressed by the slider 200 to contact with the conductive contact 320. When the magnetic component 220 is located on the power-on path D3, the slider 200 contacts the swing arm 310. When the magnetic component is located on the power-off path D2, the slider 200 contacts the swing arm 310. When the magnetic component 220 is located on the power-off path D2, the slider 200 moves away from the swing arm 310 to make the swing arm 310 separate from the conductive contact 320.

The control module 400 is arranged in the housing 100 and electrically connected to the trigger 300 and the motor 110. Specifically, the swing arm 310 and the conductive contact 320 of the trigger 300 are electrically connected to the control module 400, respectively. The control module 400 includes a magnetic sensor 410 disposed corresponding to the magnetic component 220. The magnetic sensor 410 may generate a position signal according to a position of the magnetic component 220 in the magnetic field. In this embodiment, the magnetic sensor 410 is a Hall element capable of detecting current variations induced by magnetic fields to generate position signals. However, this disclosure is not limited thereto. In this embodiment, the magnetic sensor 410 is arranged on one side of the moving path of the magnetic component 220. During the movement along the power-on path of the magnetic component 220, the sensor component is maintained on one side of the magnetic component 220 to accurately measure the position variation of the magnetic sensor 410 in the magnetic field of the magnetic component 220.

When the magnetic component 220 is located on the power-off path D2, the control module 400 is turned off. When the magnetic component 220 is located on the power-on path D3, the control module 400 is activated and subsequently outputs a control signal based on the position signal.

This disclosure includes a mechanical trigger 300 and an electromagnetic control module 400. As a result, the control module 400 may avoid the frictional wear of the related art and may further avoid consuming standby power. When pressing the slider 200 in the first stage, the mechanical trigger 300 is electrically conducted and electrified. While continuing to press the slider 200, the electromagnetic control module 400 detects the position of the magnetic sensor 410 in the magnetic field of the magnetic component, thereby outputting a corresponding control signal.

While this disclosure has been described by means of specific embodiments, numerous modifications and variations could be made thereto by those skilled in the art without departing from the scope and spirit of this disclosure set forth in the claims.

What is claimed is:

1. A switch device for a power tool, the switch device comprising:

a housing;

a slider, movably arranged on the housing;

a magnetic component, arranged on the slider and configured to generate a magnetic field, wherein the magnetic component is driven by the slider to move along a power-off path and a power-on path connected with each other;

a trigger, arranged in the housing and configured to be pressed by the slider; and a control module, arranged in the housing and electrically connected to the trigger, comprising a magnetic sensor disposed corresponding to the magnetic component and configured to generate a position signal according to a position of the magnetic component in the magnetic field;

wherein, when the magnetic component is located on the power-off path, the control module is turned off;

wherein, when the magnetic component is moved from the power-off path to the power-on path, the slider triggers the trigger to activate the control module;

wherein, when the magnetic component is located on the power-on path, the control module outputs a control signal according to the position signal.

2. The switch device according to claim 1, wherein the trigger includes a swing arm and a conductive contact electrically connected to the control module, and the swing arm is configured to be pressed by the slider to contact with the conductive contact.

3. The switch device according to claim 2, wherein the swing arm is disposed pivotally on the housing and comprises a first arm and a second arm linked to rotate pivotally, the first arm is configured to be pressed by the slider to contact with the conductive contact, and the second arm is configured to be pressed by the slider to make the first arm move away from the conductive contact.

4. The switch device according to claim 3, wherein when the magnetic component is located on the power-off path, the slider contacts the second arm.

5. The switch device according to claim 3, wherein during the magnetic component moving from the power-off path to the power-on path, the magnetic component leaves the power-off path and presses the first arm, and the magnetic component moves to the power-on path.

6. The switch device according to claim 5, wherein when the magnetic component is located on the power-on path, the slider contacts the first arm.

7. The switch device according to claim 1, further comprising an elastic component connected between the slider and the housing, and the elastic component is configured to make the slider return to an initial position.

8. The switch device according to claim 7, wherein when the slider is in the initial position, the magnetic component is located at one end of the power-off path opposite to the power-on path.

9. A power tool, comprising:

a housing;

a motor, arranged in the housing;

a slider, movably arranged on the housing;

a magnetic component, arranged on the slider and configured to generated a magnetic field, wherein the magnetic component is driven by the slider to move along a power-off path and a power-on path connected with each other;

a trigger, arranged in the housing and configured to be pressed by the slider; and a control module, arranged in the housing and electrically connected to the trigger and the motor, comprising a magnetic sensor disposed corresponding to the magnetic component and configured to generate a position signal according to a position of the magnetic component in the magnetic field;

wherein, when the magnetic component is located on the power-off path, the control module and the motor are turned off;

wherein, when the magnetic component is moved from the power-off path to the power-on path, the slider triggers the trigger to activate the control module;

wherein, when the magnetic component is located on the power-on path, the control module outputs a control signal to the motor according to the position signal, and controls the motor to an operating state correspondingly.

10. The power tool according to claim 9, wherein the trigger includes a swing arm and a conductive contact electrically connected to the control module, and the swing arm is configured to be pressed by the slider to contact with the conductive contact.

11. The power tool according to claim 10, wherein the swing arm is disposed pivotally on the housing and comprises a first arm and a second arm linked to rotate pivotally, the first arm is configured to be pressed by the slider to contact with the conductive contact, and the second arm is configured to be pressed by the slider to make the first arm move away from the conductive contact.

12. The power tool according to claim 11, wherein when the magnetic component is located on the power-off path, the slider contacts the second arm.

13. The power tool according to claim 11, wherein during the magnetic component moving from the power-off path to the power-on path, the magnetic component leaves the power-off path and presses the first arm, and the magnetic component moves to the power-on path.

14. The power tool according to claim 13, wherein when the magnetic component is located on the power-on path, the slider contacts the first arm.

15. The power tool according to claim 9, further comprising an elastic component connected between the slider and the housing, and the elastic component is configured to make the slider return to an initial position.

16. The power tool according to claim 15, wherein when the slider is on the initial position, the magnetic component is located at one end of the power-off path opposite to the power-on path.

* * * * *